(12) United States Patent  
Chen

(10) Patent No.: US 11,714,840 B2  
(45) Date of Patent: Aug. 1, 2023

(54) METHOD AND APPARATUS FOR INFORMATION QUERY AND STORAGE MEDIUM

(71) Applicant: BEIJING BAIDU NETCOM SCIENCE AND TECHNOLOGY CO., LTD., Beijing (CN)

(72) Inventor: Wanshun Chen, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 65 days.

(21) Appl. No.: 17/375,429

(22) Filed: Jul. 14, 2021

(65) Prior Publication Data

US 2021/0342376 A1    Nov. 4, 2021

(30) Foreign Application Priority Data

Dec. 23, 2020    (CN) .......................... 202011538686.1

(51) Int. Cl.

| | |
|---|---|
| G06F 16/33 | (2019.01) |
| G06F 16/332 | (2019.01) |
| G06F 16/31 | (2019.01) |
| G10L 15/02 | (2006.01) |
| G10L 15/04 | (2013.01) |
| G10L 15/18 | (2013.01) |

(52) U.S. Cl.  
CPC ........ *G06F 16/3344* (2019.01); *G06F 16/319* (2019.01); *G06F 16/3329* (2019.01); *G10L 15/02* (2013.01); *G10L 15/04* (2013.01); *G10L 15/18* (2013.01)

(58) Field of Classification Search  
CPC .................................................. G06F 16/3344  
See application file for complete search history.

(56) References Cited

U.S. PATENT DOCUMENTS

| | | | | |
|---|---|---|---|---|
| 2012/0226492 A1* | 9/2012 | Tsuboi | .................... | G06F 40/30 704/9 |
| 2020/0242486 A1* | 7/2020 | Liang | .................... | G06N 5/022 |

* cited by examiner

*Primary Examiner* — Van H Oberly  
(74) *Attorney, Agent, or Firm* — Osha Bergman Watanabe & Burton LLP

(57) ABSTRACT

The present application discloses a method and an apparatus for information query, and an electronic device, which relates to a field of deep learning (DL), natural language processing (NLP) and artificial intelligence (AI) technology. The method includes: receiving a query sentence, segmenting the query sentence to obtain word segments, and obtaining a dependency relationship between two word segments and part of speech of the word segments; obtaining a coding sequence of the query sentence according to the dependency relationship and the part of speech of the word segments; matching the coding sequence with a generalized template to obtain a core corpus of the query sentence, wherein the generalized template comprises part of speech to be extracted and a dependency relationship to be extracted; and obtaining a query result corresponding to the query sentence based on the core corpus. The application no longer relies on the accumulation of massive business scenario data to enhance a generalization ability, which ensures accurate and efficient information query, and improves the efficiency and reliability of the information query process. At the same time, it may support information query in different business scenarios, with strong expansion capability and high universality.

11 Claims, 13 Drawing Sheets

METHOD AND APPARATUS FOR INFORMATION QUERY AND STORAGE MEDIUM

CROSS-REFERENCE TO RELATED APPLICATION

The present application is based upon and claims priority to Chinese Patent Application No. 202011538686.1, filed on Dec. 23, 2020, the entirety contents of which are incorporated herein by reference.

TECHNICAL FIELD

The embodiments of the present disclosure generally relate to a field of data processing technology, and particularly to a field of deep learning (DL), natural language processing (NLP) and artificial intelligence (AI) technologies.

BACKGROUND

In recent years, since Artificial Intelligence (AI) technology is booming, there is growing concern about research on intelligent information query based on AI technology. A structured knowledge quiz is gradually becoming an essential part in intelligent scenarios, and spoken dialogue scenarios for a query (a spoken sentence) are very common in intelligent information query methods.

SUMMARY

The present disclosure provides a method and an apparatus for information query, and a storage medium.

Embodiments of the present disclosure provide a method for information query, and the method includes: receiving a query sentence, segmenting the query sentence to obtain word segments, and obtaining a dependency relationship between two word segments and part of speech of the word segments; obtaining a coding sequence of the query sentence according to the dependency relationship and the part of speech of the word segments; matching the coding sequence with a generalized template to obtain a core corpus of the query sentence, wherein the generalized template comprises part of speech to be extracted and a dependency relationship to be extracted; and obtaining a query result corresponding to the query sentence based on the core corpus.

Embodiments of the present disclosure provide an apparatus for information query, and the apparatus includes: one or more processors; a memory storing instructions executable by the one or more processors; in which the one or more processors are configured to: receive a query sentence, segment the query sentence to obtain word segments, and obtain a dependency relationship between two word segments and part of speech of the word segments; obtain a coding sequence of the query sentence according to the dependency relationship and the part of speech of the word segments; match the coding sequence with a generalized template to obtain a core corpus of the query sentence; in which, the generalized template comprises part of speech to be extracted and a dependency relationship to be extracted; obtain a query result corresponding to the query sentence based on the core corpus.

Embodiments of the present disclosure provide a non-transitory computer-readable storage medium storing computer instructions, in which when the computer instructions are executed by a computer, the computer is caused to perform a method for information query. The method includes: receiving a query sentence, segmenting the query sentence to obtain word segments, and obtaining a dependency relationship between two word segments and part of speech of the word segments; obtaining a coding sequence of the query sentence according to the dependency relationship and the part of speech of the word segments; matching the coding sequence with a generalized template to obtain a core corpus of the query sentence, wherein the generalized template comprises part of speech to be extracted and a dependency relationship to be extracted; and obtaining a query result corresponding to the query sentence based on the core corpus.

It should be understood that, the content described in the part is not intended to recognize key or important features of embodiments of the present disclosure, nor intended to limit the scope of the present disclosure. Other features of the present disclosure will be easy to understand through the following specification.

BRIEF DESCRIPTION OF THE DRAWINGS

The drawings are intended to better understand the solution, and do not constitute a limitation to the disclosure.

FIG. 2-1 is a diagram illustrating a query method of the user;

FIG. 2-2 is a diagram illustrating another query method of the user;

FIG. 2-3 is a diagram illustrating yet another query method of the user;

FIG. 3 is a diagram illustrating obtaining a coding sequence of the query sentence;

DETAILED DESCRIPTION

Figure 1:
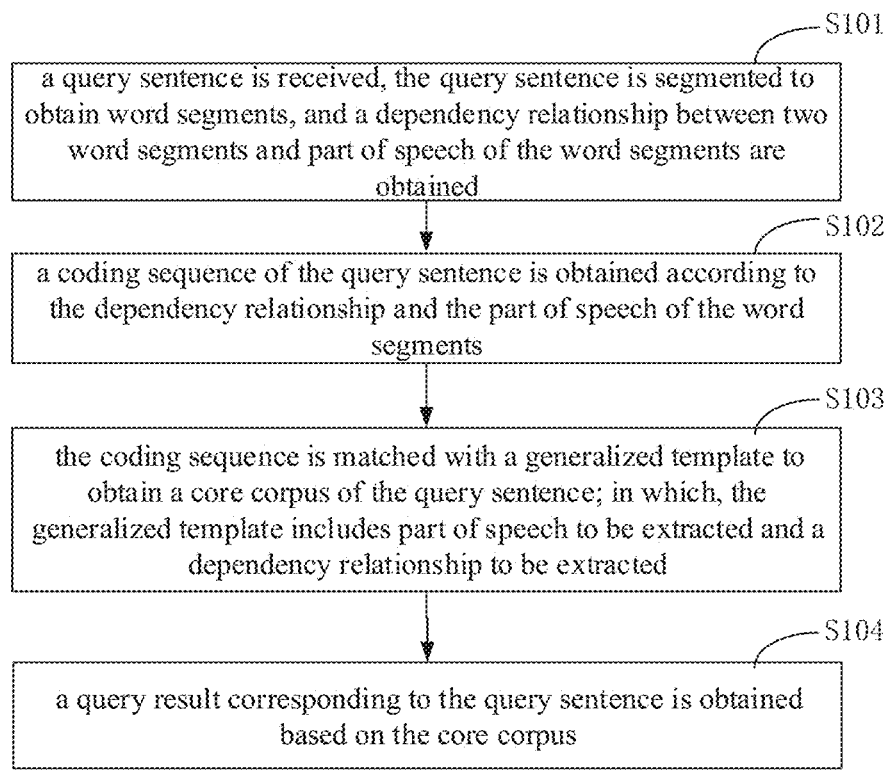
FIG. 1 is a diagram illustrating a first embodiment of the present disclosure.

The exemplary embodiments of the present disclosure are described as below with reference to the accompanying drawings, which include various details of embodiments of the present disclosure to facilitate understanding, and should be considered as merely exemplary. Therefore, those skilled in the art should realize that various changes and modifications may be made to the embodiments described herein without departing from the scope and spirit of the present disclosure. Similarly, for clarity and conciseness, descriptions of well-known functions and structures are omitted in the following descriptions.

In related arts, based on the richness of language expression, a query with the same meaning usually has many different expressions. Thus, querying according to the existing information query methods to ensure the accuracy of query results may exist long time consuming and high cost problems, which is bound to lead to extremely low efficiency in the information query process and poor user experience. Therefore, it has become one of important research directions how to ensure the accuracy of information query results and improve the efficiency and reliability of information query process.

The following is a brief description of technical fields the scheme relates to.

Data Processing, including processing of data collection, storage, retrieval, processing, change and transmission, is designed to extract and deduce valuable and meaningful data for certain specific users from a large number of data that may be disorganized and difficult to understand.

Artificial intelligence (AI) is a subject that learns simulating certain thinking processes and intelligent behaviors (such as learning, reasoning, thinking, planning, etc.) of human beings by a computer, which covers hardware-level technologies and software-level technologies. AI technologies generally include computer vision technology, speech recognition technology, natural language processing (NLP) technology and its learning/deep learning (DL), big data processing technology, knowledge graph technology, etc.

Deep Learning (DL) is a new research direction in the field of Machine Learning (ML), which is introduced into ML so that it is closer to its original goal-artificial intelligence (AI). DL learns inherent law and representation hierarchy of sample data, and information obtained in the learning process is of great help in interpretation of data such as words, images and sound Its final goal is that the machine may have analytic learning ability like humans, which may recognize data such as words, images, sound, etc. DL is a complicated machine learning algorithm, which has far outperformed the related art in speech and image recognition.

Natural language processing (NLP) is an important direction in the field of computer science and AI. It studies all kinds of theories and methods that may achieve effective communication between human and computer by natural language. NLP is a science that integrates linguistics, computer science, and mathematics. The research of NLP relates to natural language, that is, the language people use every day, therefore, it is closely related to the study of linguistics, but with important differences.

It should be noted that, the biggest problem of structured knowledge quiz research is how to solve the problem of semantic generalization. In the related art, the generalization problem of language expression is solved by DL usually based on X-SQL, Hydranet and other models.

However, if DL is adopted to solve the generalization problem of language expression, massive data need to be tagged to construct a complete data set as far as possible, further to provide more effective training samples for the model for the convenience of improving the recognition capacity of the model, so that it is bound to lead to weak expansion ability in the information inquiry process, poor universality, high cost, long time consuming, weak result controllability and not easy intervention.

Thus, the method for information query provided in the present disclosure may ensure accuracy of the query result, reduce cost and improve the efficiency and reliability in the information query process through a generalized matching technology based on dependency parsing.

A method and an apparatus for information query, and an electronic device are described referring to drawings below in embodiments of the present disclosure.

FIG. 1 is a diagram illustrating a first embodiment of the present disclosure. It should be noted that, the execution subject of the method for information query in the embodiment is a server. As illustrated in FIG. 1, the method for information query in the embodiment includes followings.

At S101, a query sentence is received, the query sentence is segmented to obtain word segments, and a dependency relationship between two word segments and part of speech of the word segments are obtained.

It should be noted that, based on the richness of language expression, a query with the same meaning usually has many different expressions. For example, the query sentences obtained are "车辆甲的发动机马力 (Chinese characters, which means an engine horsepower of a vehicle A)" and "车辆甲的发动机功率 (Chinese characters, which means an engine power of a vehicle A)", in this case, "发动机的马力 (Chinese characters, which means an engine horsepower)" and "发动机功率 (Chinese characters, which means an engine power)" are two common generalization expressions.

In the present disclosure, in order to solve the generalization problem of language expression, massive tagged data are not relied on to obtain the query result, and through a generalized matching technology based on dependency parsing, the answer matching the query sentence received is obtained to achieve information query. The query sentence received may be a question proposed by the user.

Figures 1, 2:
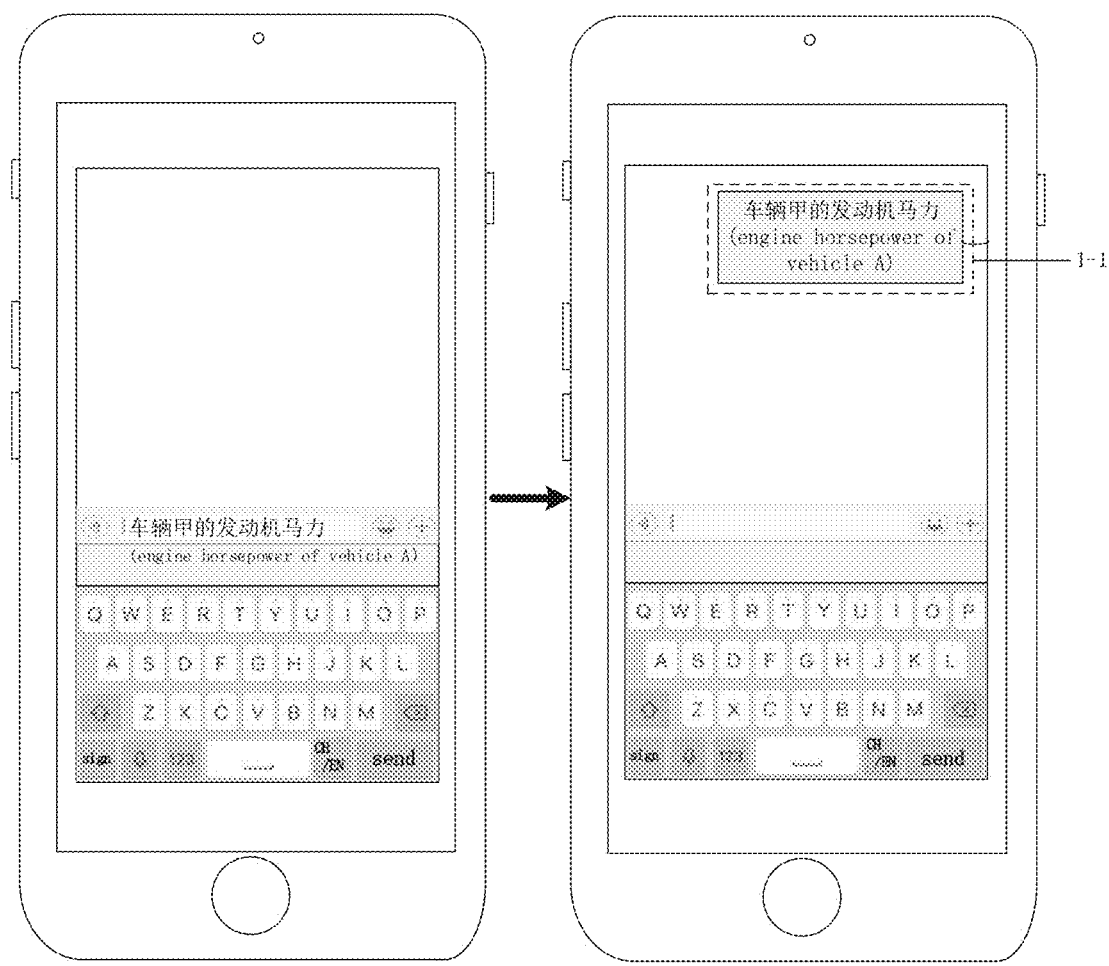
Figure 2:
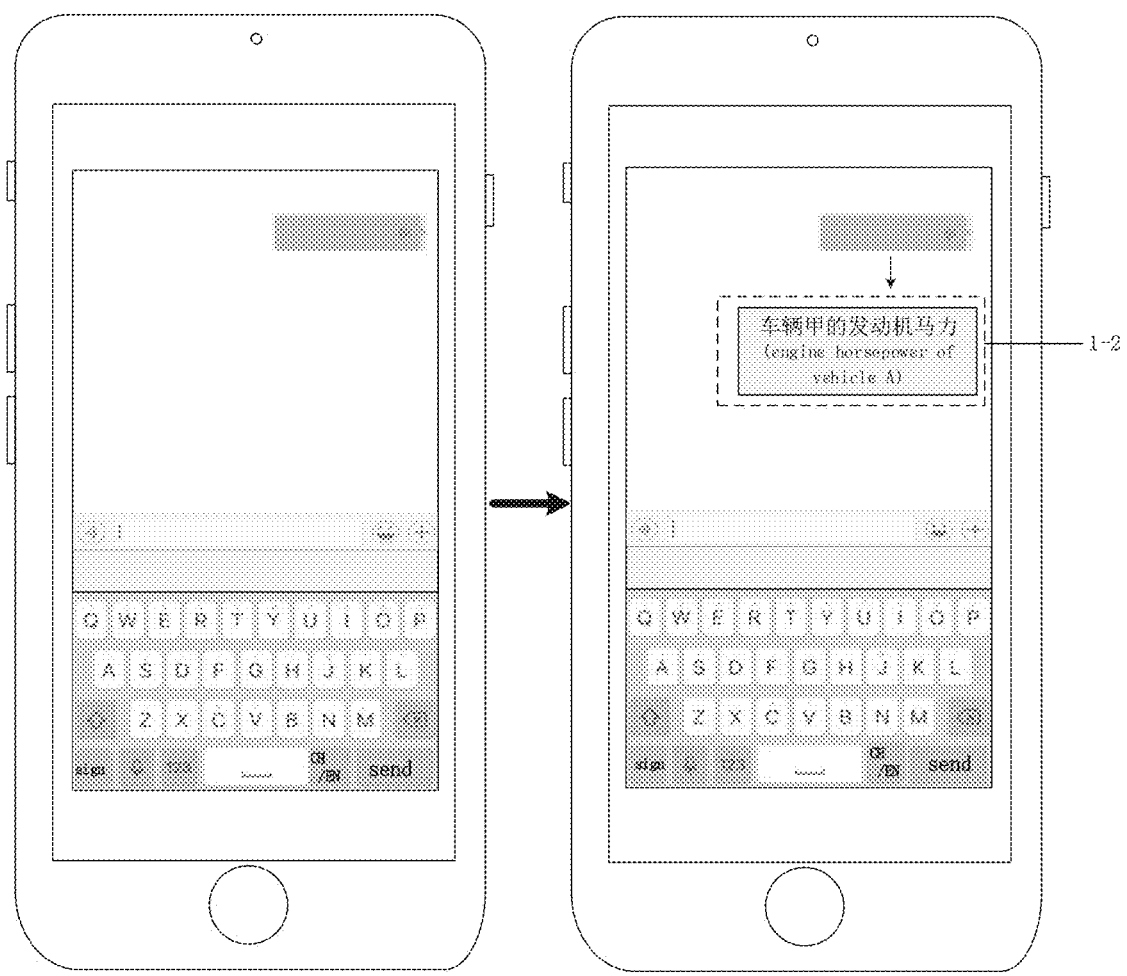
Figures 2, 3:
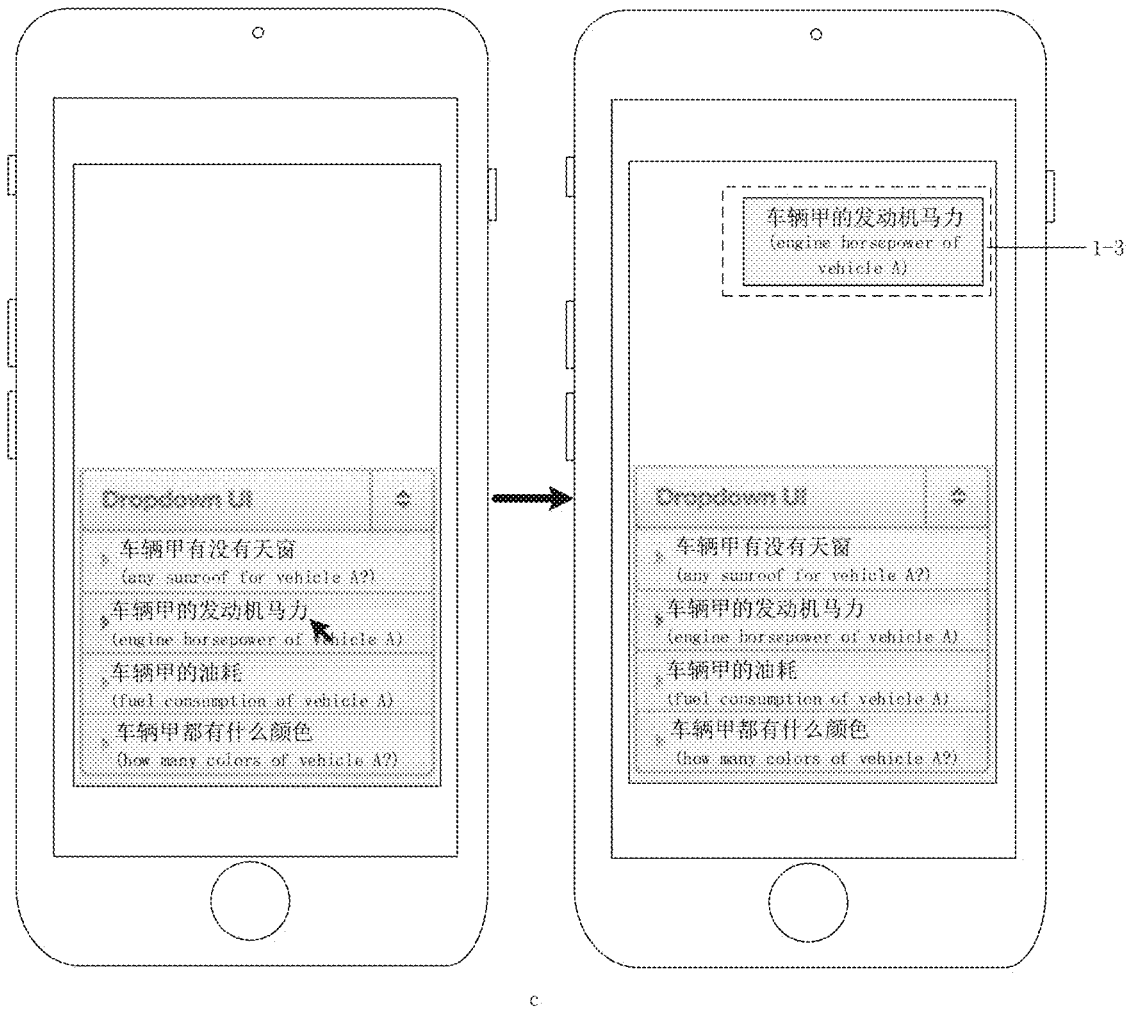
Figure 3:
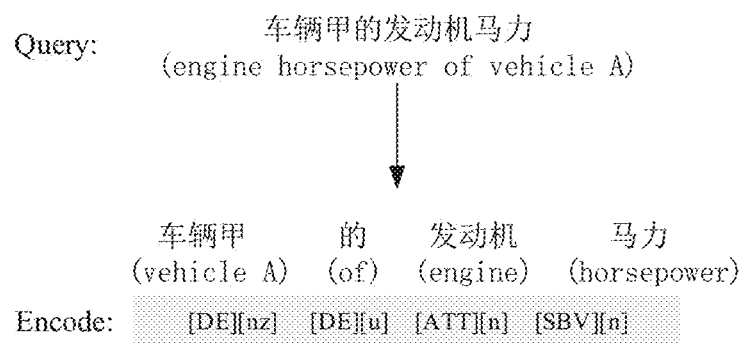

It should be noted that, in the present disclosure, the user may propose a question through inputting text information, inputting speech information or selecting text information. For example, as illustrated in FIG. 2-1, the user may input a text on the input interface of the user's terminal, in this case, the user's question is text information 1-1; for another example, as illustrated in FIG. 2-2, the user may input a speech on the input interface of the user's terminal, in this case, the user's question is speech information 1-2; for another example, as illustrated in FIG. 2-3, the user may select a text provided by the interface on the input interface of the user's terminal, in this case, the user's question is text information 1-3.

In the embodiment of the present disclosure, after the user proposes a question, text information may be directly taken as a query sentence, and after speech information is transformed into text information, the text information obtained by transformation may be also taken as a query sentence.

For example, the user proposes the following questions in the form of speech input: "车辆甲的发动机马力 (Chinese characters, which means an engine horsepower of a vehicle A)", after the user proposes a question, speech information may be transformed into text information "车辆甲的发动机马力 (Chinese characters, which means an engine horsepower of a vehicle A)", which is taken as a query sentence.

Further, after a query sentence is received, word segments and part of speech tagging are performed on the query sentence to obtain dependency relationships and part of speech of the word segments.

Word segmentation processing is performed based on statistics, and the sample content through statistics are from some standard corpuses. For example, word segments is performed on "车辆甲 的发动机马力(Chinese characters, which means an engine horsepower of a vehicle A)", to obtain four segmentations "车辆甲 (Chinese characters, which means a vehicle A)", "的 (Chinese characters, which means of)", "发动机 (Chinese characters, which means engine)" and "马力 (Chinese characters, which means horsepower)".

The dependency relationship may include: Subject Verb (SBV), Verb Object (VOB), Indirect Object (IOB), Attribute (ATT) and Adverbial (ADV), etc. Optionally, the dependency relationship may be a dependency relationship between any two word segments. For example, a dependency relationship between "发动机 (engine)" and "马力 (horsepower)" is ATT.

The part of speech refers to a characteristic of a word which is taken as basis of word classification, which may include a verb (v), a noun (n), other special nouns (nz), an auxiliary word(u), etc.

It should be noted that, the specific method for word segments in the present disclosure may be set according to the actual situation. For example, a forward maximum matching method, a backward maximum matching method and the shortest path segmentation method may be adopted to perform word segments on the text content.

It should be noted that, the specific method for part of speech tagging in the present disclosure may be set according to the actual situation. For example, the word segments obtained may be input to a Markov Model, to obtain part of speech of the word segments.

At S102, a coding sequence of the query sentence is obtained according to the dependency relationship and the part of speech of the word segments.

In the embodiment of the present disclosure, after the dependence relationship and the part of speech of the word segments are obtained, the dependence relationship and part of speech of the word segments may be taken as an Encode rule to obtain a coding sequence of the query sentence.

For example, as illustrated in FIG. 3, after the query sentence "车辆甲的 发动机马力 (Chinese characters, which means an engine horsepower of a vehicle A)" is received, word segments and part of speech tagging may be performed on the query sentence to obtain the dependence relationships of the word segmentss: [DE], [DE], [ATT] and [SBV], and parts of speech [nz], [u], [n] and [n]. In this case, the dependence relationships and parts of speech of the word segmentss may be taken as an Encode rule to obtain a coding sequence of the query sentence: [DE][nz][DE][u] [ATT][n] [SBV][n]. [DE] represents "的 (Chinese characters, which means of)".

At S103, the coding sequence is matched with a generalized template to obtain a core corpus of the query sentence; in which, the generalized template includes part of speech to be extracted and a dependency relationship to be extracted.

In the embodiment of the present disclosure, after the codding sequence of the query sentence is obtained, the coding sequence may be matched with a generalized template and the matched generalized template may be taken as a Decode rule to obtain core corpuses of the query sentence. That is, after the coding sequence is matched with a generalized template, the core corpuses of the query sentence may be obtained by transcoding and other methods. The generalized template stores a dependency relationship to be extracted and part of speech to be extracted.

Figure 4:
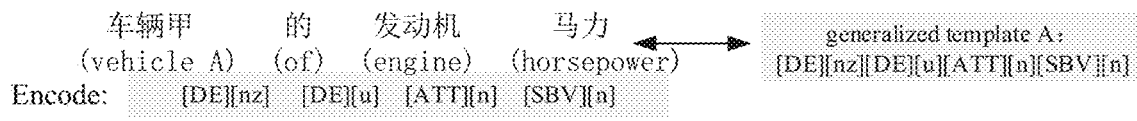
FIG. 4 is a diagram illustrating obtaining core corpuses of the query sentence.

For example, as illustrated in FIG. 4, the obtained coding sequence of the query sentence is [DE][nz][DE][u] [ATT] [n][SBV][n]. In this case, the coding sequence may be matched with a generalized template and the matched generalized template A may be taken as a Decode rule to obtain core corpuses of the query sentence: 【车辆甲 (vehicle A)】, 【发动机马力 (engine horsepower)】.

It should be noted that, in the present disclosure, in order to enhance a generalization ability and ensure effective information query, so as to support different business scenarios, a plurality of generalized templates obtained according to experience may be preset.

For example, for a business scenario A, a generalized template B may be preset as [DE][nz][DE][u] [ATT][n] [SBV][n], in this case, for the query sentence "车辆甲的发动机马力 (engine horsepower of a vehicle A)", core corpuses obtained are 车辆甲 车辆甲 (vehicle A)】, 车辆甲 发动机马力 (engine horsepower)】; for a business scenario B, a generalized template C may be preset as [ATT][n][DE][u] [SBV][n], in this case, for the query sentence "腐烂的西红柿 (rotten tomatoes)", core corpuses obtained are 车辆甲 烂 (rotten)】, 车辆甲 西红柿 (tomatoes)】.

At S104, a query result corresponding to the query sentence is obtained based on the core corpus.

Figure 5:
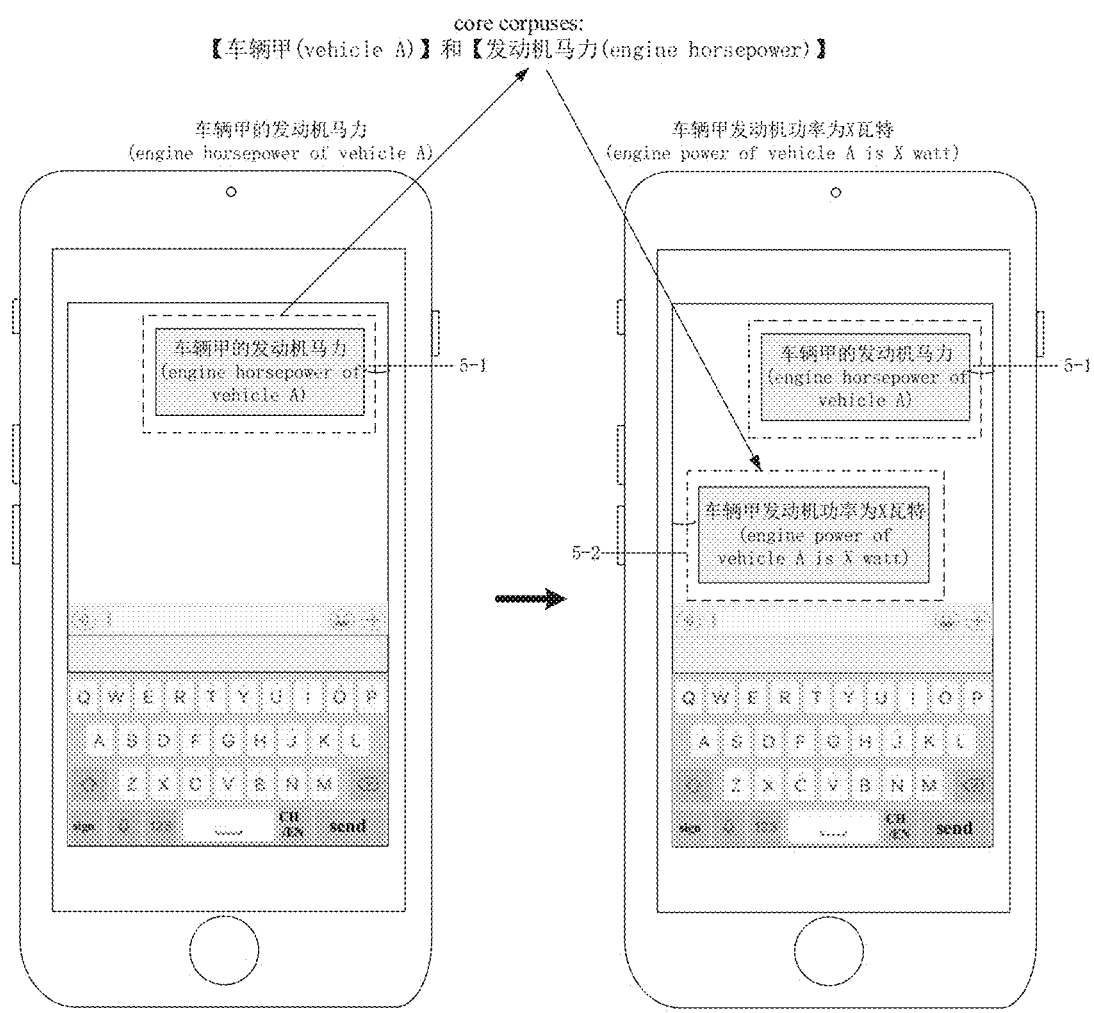
FIG. 5 is a diagram illustrating obtaining a query result corresponding to the query sentence.

For example, as illustrated in FIG. 5, the core corpuses 5-1 of the query sentence are 【车辆甲 (vehicle A)】, 【发动机马力 (engine horsepower)】, and the query result 520 corresponding to the query sentence obtained is 车辆甲发动机功【率为X瓦特 (the engine horsepower of the vehicle A is X watt)】.

According to the method for information query in the embodiment of the present disclosure, a dependency relationship and part of speech of the word segments may be obtained by receiving and segmenting the query sentence, and a coding sequence of the query sentence is obtained according to the dependency relationship and the part of speech of the word segments, and the coding sequence is matched with a generalized template to obtain core corpuses of the query sentence, and a query result corresponding to the query sentence is obtained based on the core corpus of the query sentence to achieve information query without relying on the accumulation of massive business scenario data, thereby enhancing a generalization ability, ensuring the accuracy and efficiency of information query, and improving the efficiency and reliability of the information query process. At the same time, information query in different business scenarios may be supported, with strong expansion capability and high universality.

Figure 6:
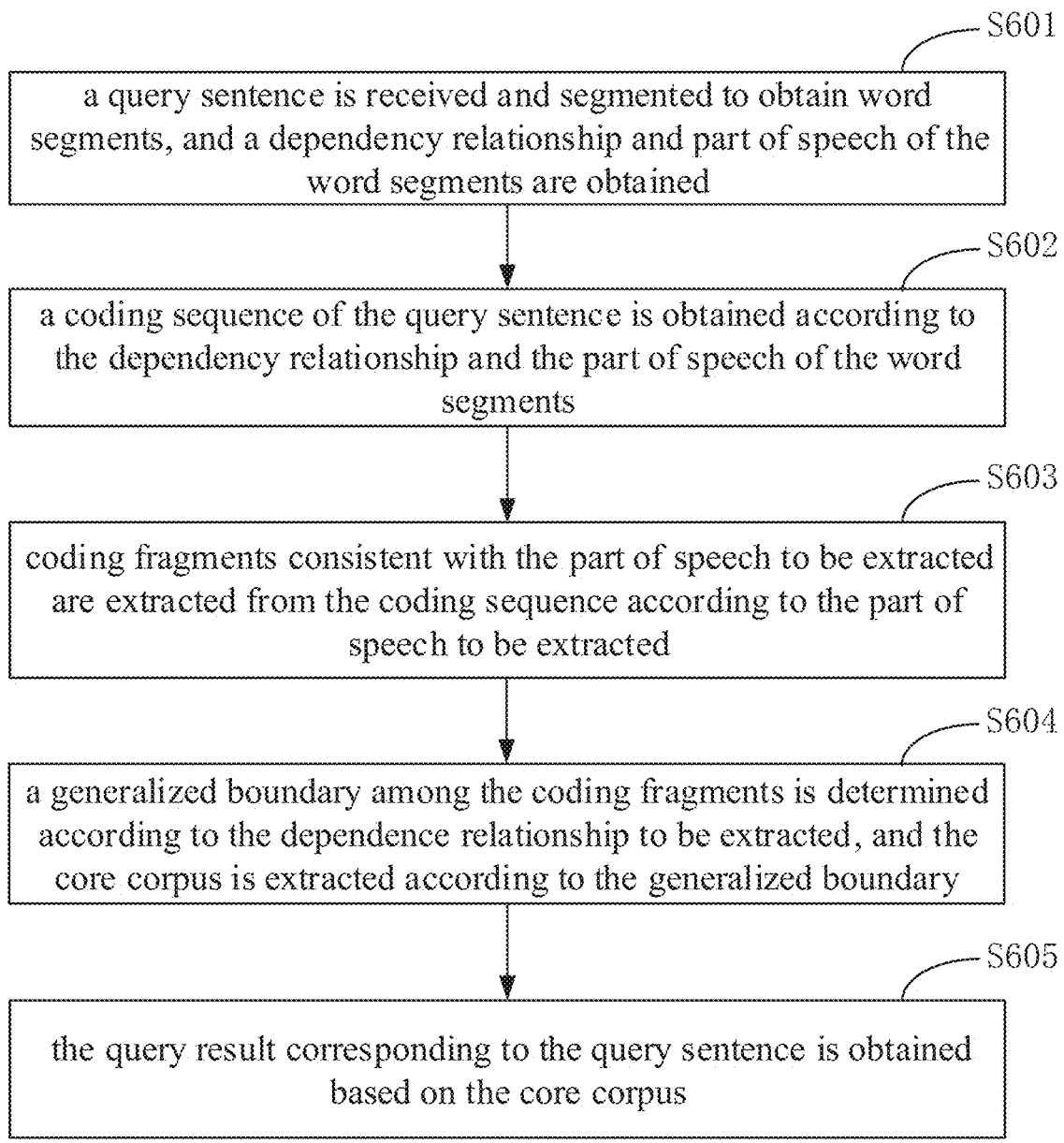
FIG. 6 is a diagram illustrating a second embodiment of the present disclosure.

FIG. 6 is a diagram illustrating a second embodiment of the present disclosure.

As illustrated in FIG. 6, on the basis of the above embodiment, the method for information query in the embodiment includes the followings.

At S601, a query sentence is received and segmented to obtain word segments, and a dependency relationship and part of speech of the word segments are obtained.

At S602, a coding sequence of the query sentence is obtained according to the dependency relationship and the part of speech of the word segments.

The blocks S601~S602 are the same with the blocks S101~S102 in the above embodiment, which will not be repeated here.

The block S103 in the above embodiment may include the following blocks S603~S604.

At S603, coding fragments consistent with the part of speech to be extracted are extracted from the coding sequence according to the part of speech to be extracted.

For example, the following generalized templates are preset: [DE][nz][DE][u] [ATT][n][SBV][n], [DE][nz] [ATT][n] [ATT][n][SBV][n], [DE][nz][ATT][u] [ATT][n] [SBV][n], and the parts of speech to be extracted is obtained as:[nz][u] [n][n].

In this case, for "车辆甲的发动机马力 (the engine horsepower of the vehicle A)", coding fragments consistent with the parts of speech to be extracted are extracted as: [DE] [nz][DE][u] [ATT][n][SBV][n] and [DE][nz][ATT][u] [ATT][n][SBV][n].

At S604, a generalized boundary among the coding fragments is determined according to the dependence relationship to be extracted, and the core corpus is extracted according to the generalized boundary.

For example, coding fragments consistent with the parts of speech to be extracted are extracted: [DE][nz][DE][u] [ATT][n][SBV][n] and [DE][nz][ATT][u] [ATT][n][SBV] [n], the dependence relationship to be extracted are obtained as:[DE][DE][ATT][SBV].

In this case, for "车辆甲的发动机马力 (the engine horsepower of the vehicle A)", a generalized boundary between the coding fragments is determined according to the dependence relationship to be extracted, and core corpuses extracted according to the generalized boundary are 【车辆甲 (vehicle A)】 and 【发动机马力 (engine horsepower)】 matching with [DE][nz][DE][u] [ATT][n][SBV] [n].

At S605, the query result corresponding to the query sentence is obtained based on the core corpus.

The block S605 is the same with the block S104 in the above embodiment, which will not be repeated here.

According to the method for information query in the embodiment of the present disclosure, coding fragments may be extracted according to parts of speech to be extracted, and a generalized boundary among coding fragments is determined according to the dependence relationship, and core corpuses are extracted according to a generalized boundary so that a generalization problem may be solved and time consuming of the information query process may be shortened, the efficiency and reliability of the information query process may be improved.

Figure 7:
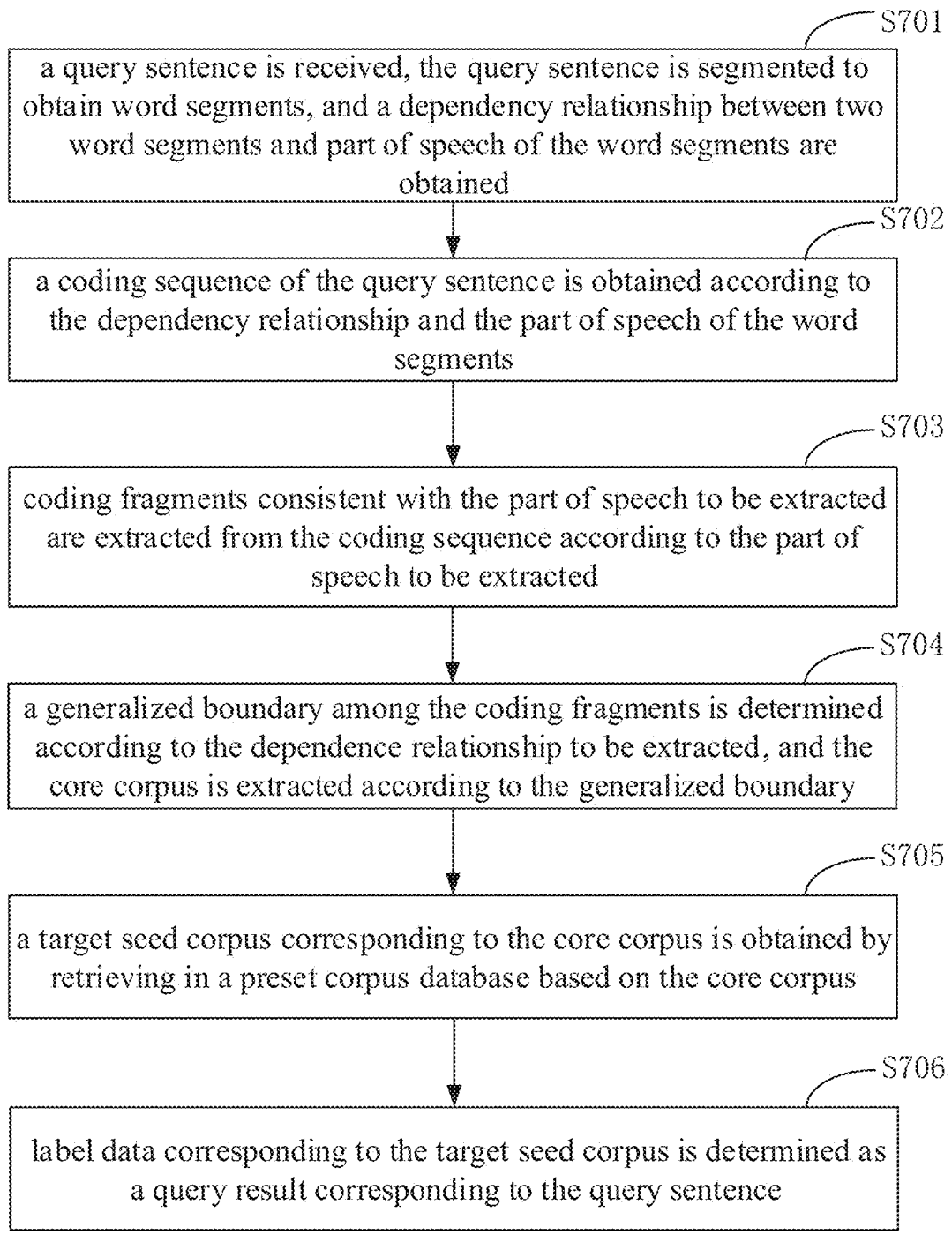
FIG. 7 is a diagram illustrating a third embodiment of the present disclosure.

FIG. 7 is a diagram illustrating a third embodiment of the present disclosure.

As illustrated in FIG. 7, on the basis of the above embodiment, the method for information query in the embodiment includes the followings.

At S701, a query sentence is received, the query sentence is segmented to obtain word segments, and a dependency relationship between two word segments and part of speech of the word segments are obtained.

At S702, a coding sequence of the query sentence is obtained according to the dependency relationship and the part of speech of the word segments.

The blocks S701~S702 are the same with the blocks S101~S102 in the above embodiment, which will not be repeated here.

At S703, coding fragments consistent with the part of speech to be extracted are extracted from the coding sequence according to the part of speech to be extracted.

At S704, a generalized boundary among the coding fragments is determined according to the dependence relationship to be extracted, and the core corpus is extracted according to the generalized boundary.

The blocks S703~S704 are the same with the blocks S603~S604 in the above embodiment, which will not be repeated here.

The block S104 in the above embodiment may include the following blocks S705~S706.

At S705, a target seed corpus corresponding to the core corpus is obtained by retrieving in a preset corpus database based on the core corpus.

Figure 8:
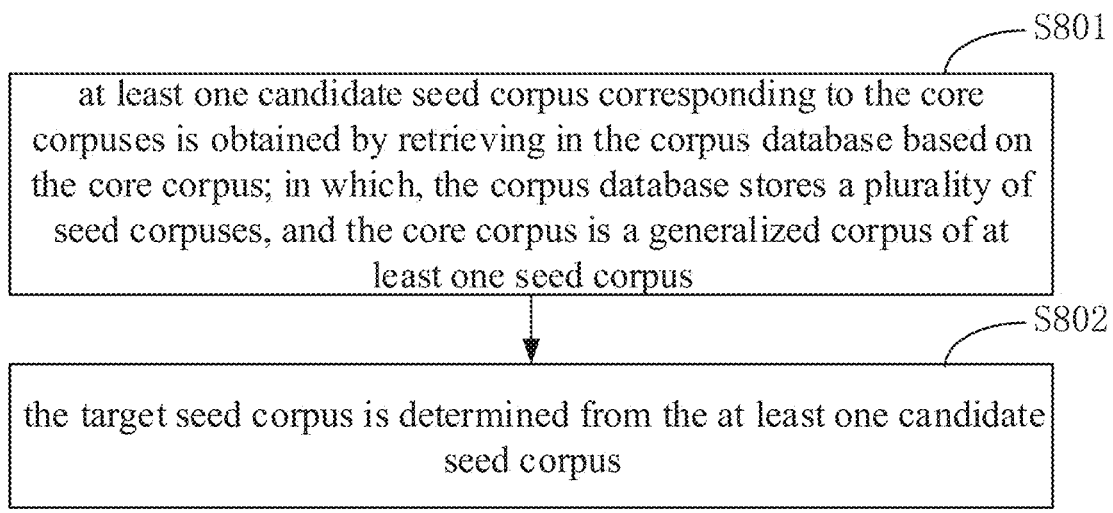
FIG. 8 is a diagram illustrating a fourth embodiment of the present disclosure.

As a possible implementation, as illustrated in FIG. 8, on the basis of the above embodiment, it includes the followings.

At block S801, at least one candidate seed corpus corresponding to the core corpuses is obtained by retrieving in the corpus database based on the core corpus; in which, the corpus database stores a plurality of seed corpuses, and the core corpus is a generalized corpus of at least one seed corpus.

In the embodiment of the present disclosure, based on an inverted index and semantic similarity computation, the core corpuses may be retrieved from the corpus database to obtain at least one candidate seed corpus.

The corpus database is a structured data storage form. Optionally, content extraction may be performed on the table data based on the user's form data in advance, and the content extracted may be configured to form a corpus database.

The core corpus is a generalized corpus of at least one seed corpus. For example, 【发动机马力(engine horsepower)】 is a generalized corpus of the seed corpus 【发动机功率(engine power)】.

Inverted index comes from necessity to search record records according to the attribute value in practical applications. Each item in the index table includes an attribute value and an address of each record with the attribute value. Since it determines the record position by the attribute value rather than determines the attribute value by record, it is referred to as an inverted index.

Convolutional Neural Networks(CNN) and other semantic similarity computation methods may be adopted in semantic similarity computation.

At block S802, the target seed corpus is determined from the at least one candidate seed corpus.

In the embodiment of the present disclosure, a similarity between the core corpus and each candidate seed corpus may be obtained, and the candidate seed corpus with the highest similarity is selected as the target seed corpus.

It should be noted that, the specific method for obtaining a similarity between the core corpus and each candidate seed corpus is not limited, which may be selected according to the actual situation. For example, the candidate seed corpus with the highest similarity may be reserved as the final target seed corpuses through Simnet (artificial network), a cosine distance based on BOW, and Best Matching 25 (BM25).

At S706, label data corresponding to the target seed corpus is determined as a query result corresponding to the query sentence.

For example, the label data corresponding to the target seed corpuses 【车辆甲(vehicle A)】 and 【发动机功率(engine power)】 are 【车辆甲(vehicle A)】 and 【发动机功率为X 瓦特(the engine power is X watt)】, in this case, the query result corresponding to the query sentence is 【车辆甲发动机功率为X 瓦特(the engine power of the vehicle A is X watt)】.

According to the method for information query in the embodiment of the present disclosure, at least one candidate seed corpus corresponding to the core corpus is obtained through rough ordering by retrieving in the corpus database based on the core corpus, and target seed corpus is obtained through fine ordering by obtaining the similarity between the core corpus and each candidate seed corpus, and the candidate seed corpus with the highest similarity is selected as the target seed corpus, so that real label data may be recalled through rough ordering and fine ordering, further to obtain a more accurate query result and improve the efficiency and reliability of the information query process.

It should be noted that, in the embodiment of the present disclosure, a generalized template may be constructed according to field experience in advance. Further, in order to improve the adaptability of the generalized template, the corresponding generalized templates may be configured according to different expression ways of the core corpuses in different business scenarios. In which, a majority of generalized templates are universal generalized templates, which may be applied to a plurality of business scenarios, and other generalized templates are adjusted according to the requirement of a particular field to construct part of customized generalized templates.

Further, during the information query process, owed recall or extended recall may appear. The method for information query in the embodiment may update a generalized template for owed recall or extended recall.

Figure 9:
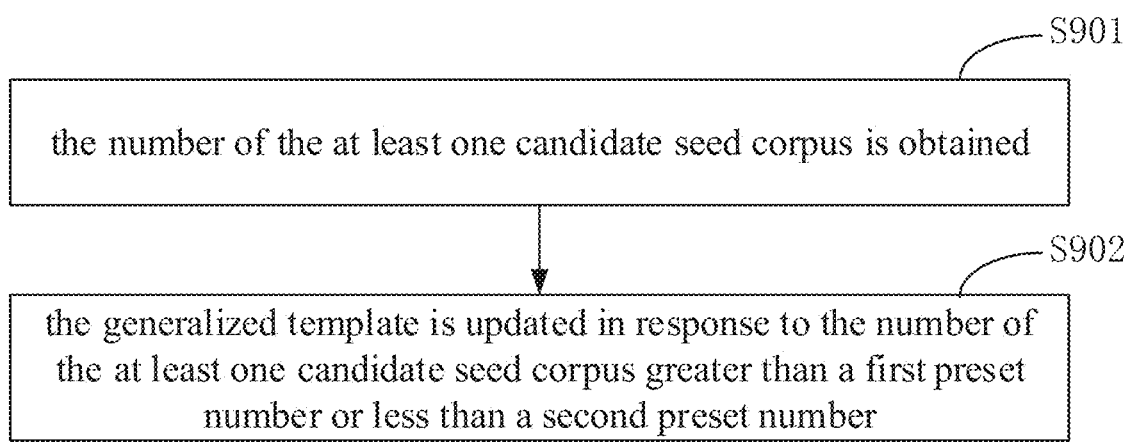
FIG. 9 is a diagram illustrating a fifth embodiment of the present disclosure.

As a possible implementation, as illustrated in FIG. 9, on the basis of the above embodiment, it includes the followings.

At S901, the number of the at least one candidate seed corpus is obtained.

At S902, the generalized template is updated in response to the number of the at least one candidate seed corpus greater than a first preset number or less than a second preset number.

The first preset number and the second preset number may be set according to the actual situation.

For example, the number of the candidate seed corpuses is k, the first preset number is k1 and the second preset number is k2. In this case, if k>k1, it indicates that extended recall exists, a generalized template may be updated; if k<k2, it indicates that owed recall exists, a generalized template may be updated.

According to the method for information query in the embodiment of the present disclosure, the number of the candidate seed corpuses is obtained, and the generalized template is updated in response to the number of the candidate seed corpuses greater than a first preset number or less than a second preset number, so that a generalized template is updated at any time when owed recall or extended recall appears to perform immediate intervention on errors, which ensures a more accurate search result obtained, further improves the efficiency and reliability of the information query process and enhances the controllability and stability of the information query process.

Figure 10:
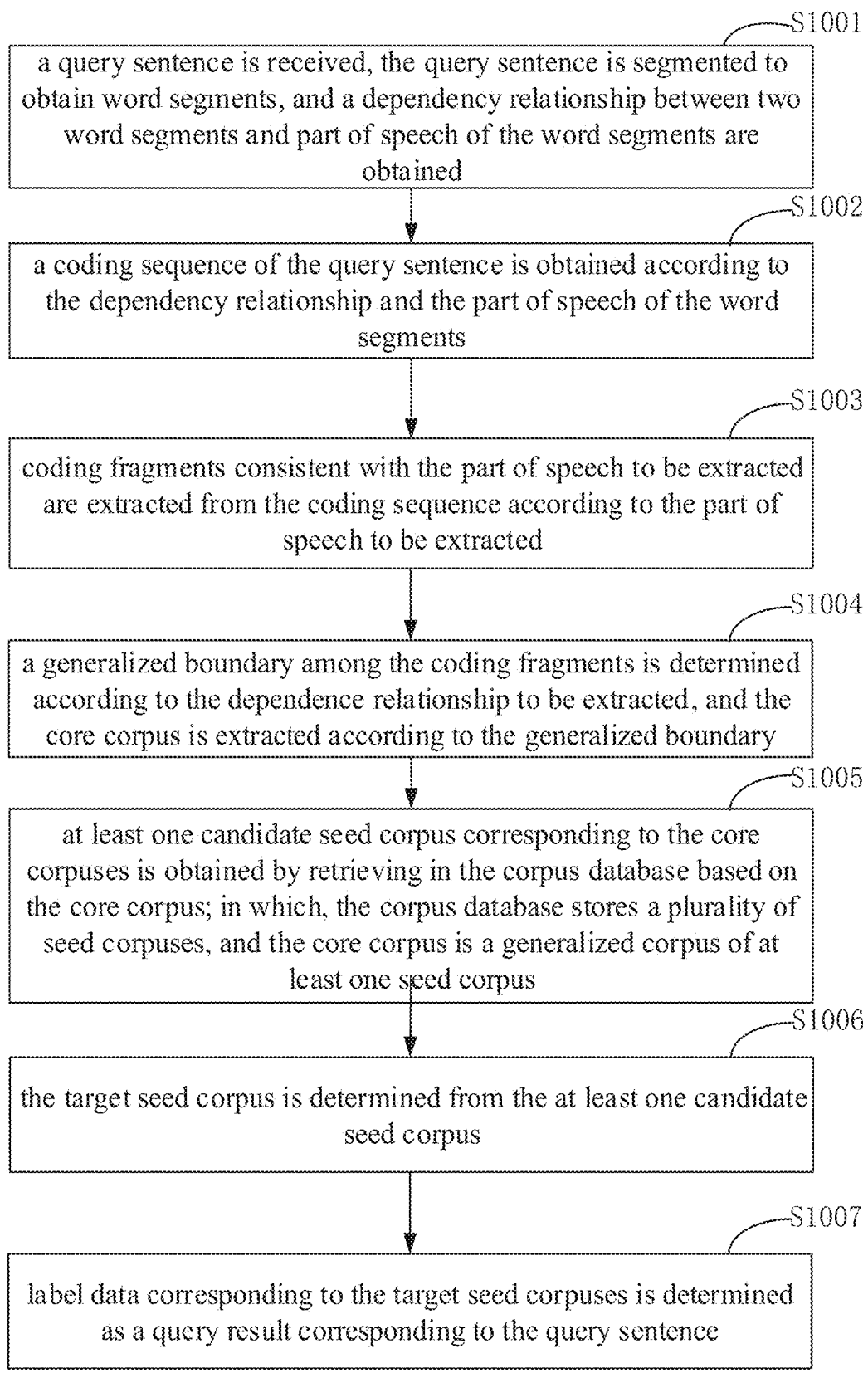
FIG. 10 is a diagram illustrating a sixth embodiment of the present disclosure.

FIG. 10 is a diagram illustrating a sixth embodiment of the present disclosure.

As illustrated in FIG. 10, on the basis of the above embodiment, the method for information query in the embodiment includes the followings.

At S1001, a query sentence is received, the query sentence is segmented to obtain word segments, and a dependency relationship between two word segments and part of speech of the word segments are obtained.

At S1002, a coding sequence of the query sentence is obtained according to the dependency relationship and the part of speech of the word segments.

At S1003, coding fragments consistent with the part of speech to be extracted are extracted from the coding sequence according to the part of speech to be extracted.

At S1004, a generalized boundary among the coding fragments is determined according to the dependence relationship to be extracted, and the core corpus is extracted according to the generalized boundary.

At S1005, at least one candidate seed corpus corresponding to the core corpuses is obtained by retrieving in the corpus database based on the core corpus; in which, the corpus database stores a plurality of seed corpuses, and the core corpus is a generalized corpus of at least one seed corpus.

At block S1006, the target seed corpus is determined from the at least one candidate seed corpus.

At S1007, label data corresponding to the target seed corpuses is determined as a query result corresponding to the query sentence.

It should be noted that, the descriptions of blocks S1001~S1007 may refer to the relevant records in the above embodiments, which will not be repeated here.

It should be noted that, the method for information query in the present disclosure may be applied in a plurality of scenarios.

In a human-computer interaction application scenario such as intelligent speech customer service, on basis of NLP technology, a speech input by the user may be transformed into text information and taken as a query sentence, and the query sentence may be segmented, a dependency relationship and part of speech of the word segments may be obtained. Then, a coding sequence of the query sentence may be obtained according to the dependency relationship and the part of speech of the word segments based on DL and AI technologies, and the coding sequence is matched with a generalized template to obtain core corpuses of the query sentence, and a query result corresponding to the query sentence is obtained further based on the core corpuses of the query sentence, so as to achieve information query.

Figure 11:
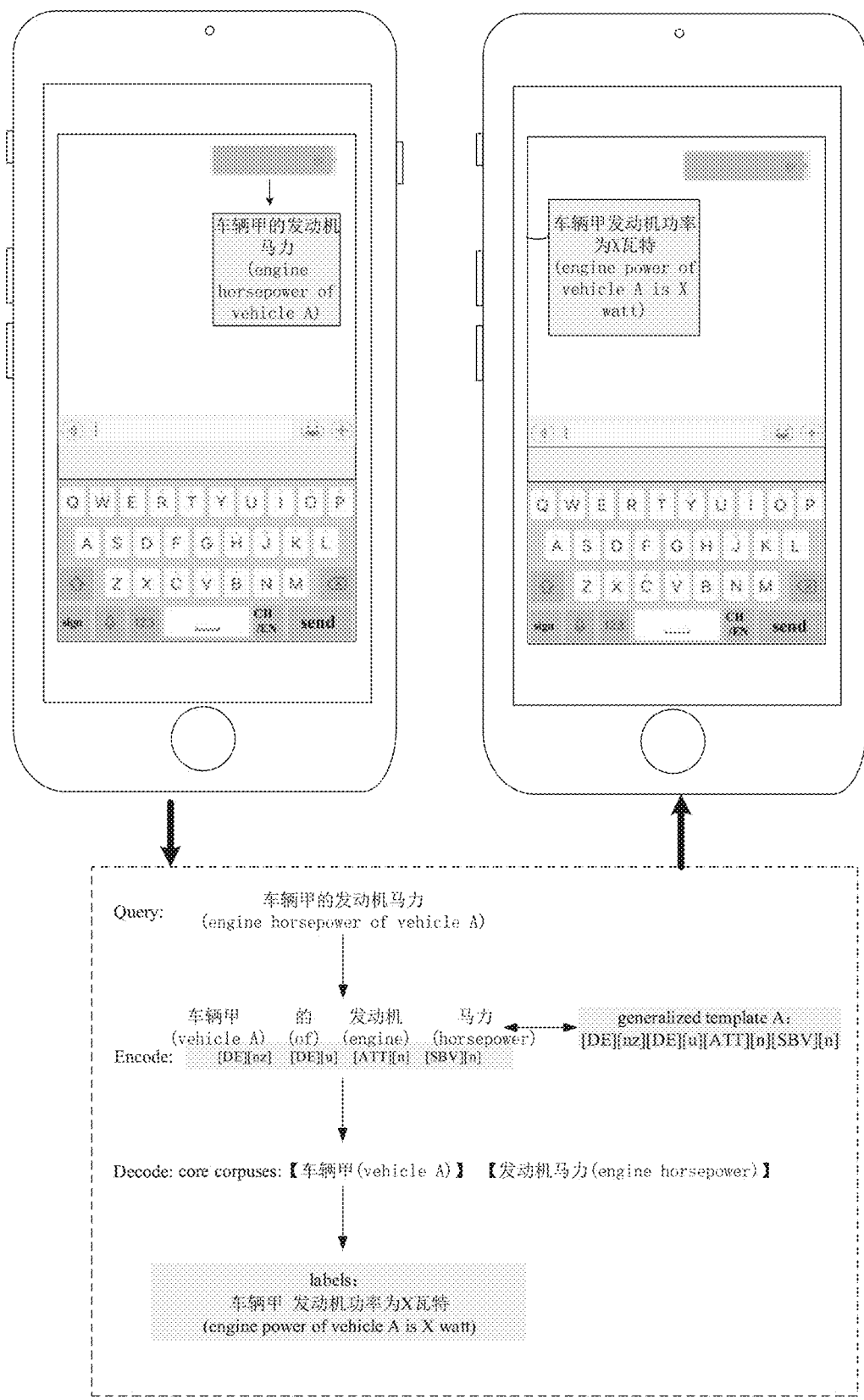
FIG. 11 is a diagram illustrating an interaction process of intelligent speech customer service.

For example, as illustrated in FIG. 11, the user attempts to input a speech " 车辆甲的发动机 马力(the engine horsepower of the vehicle A)" to propose a problem. Optionally, a dependency relationship and part of speech of word segments may be obtained by transforming the speech into text information " 车辆甲的发 动机马力(the engine horsepower of the vehicle A)" as a query sentence and segmenting the query sentence, and then a coding sequence of the query sentence [DE][nz][DE][u][ATT][n] [SBV][n] may be obtained according to the dependency relationship and part of speech of word segments based on DL and AI technologies. Further, the coding sequence may be matched with a generalized template to obtain core corpuses of the query sentence 【车辆甲(vehicle A)】, 【发动机马力(engine horsepower)】, further to obtain the query result corresponding to the query sentence 【车辆甲发动机 功率为X 瓦特(the engine power of the vehicle A is X watt)】 based on the core corpuses to achieve information query.

According to the method for information query in the embodiment of the present disclosure, a dependency relationship and part of speech of the word segments may be obtained through receiving and segmenting a query sentence, and a coding sequence of the query sentence is obtained according to the dependency relationship and the part of speech of the word segments, and the coding sequence is matched with a generalized template to obtain core corpuses of the query sentence, and a query result corresponding to the query sentence is obtained further based on the core corpuses of the query sentence, so as to achieve information query without relying on the accumulation of massive business scenario data to enhance a generalization ability, thereby ensuring accuracy and efficiency of information query, and improving the efficiency and reliability of the information query process. At the same time, information query in different business scenarios may be supported, with strong expansion capability and high universality.

Corresponding to the method for information query provided by the above embodiments, one embodiment of the present disclosure further provides an apparatus for information query. Since the apparatus for information query provided in the embodiments of the present disclosure corresponds to the method for information query provided in the above several embodiments of the present disclosure, the implementation of the method for information query also applies to the apparatus for information query provided in the embodiment, which will not be described in the embodiment.

Figure 12:
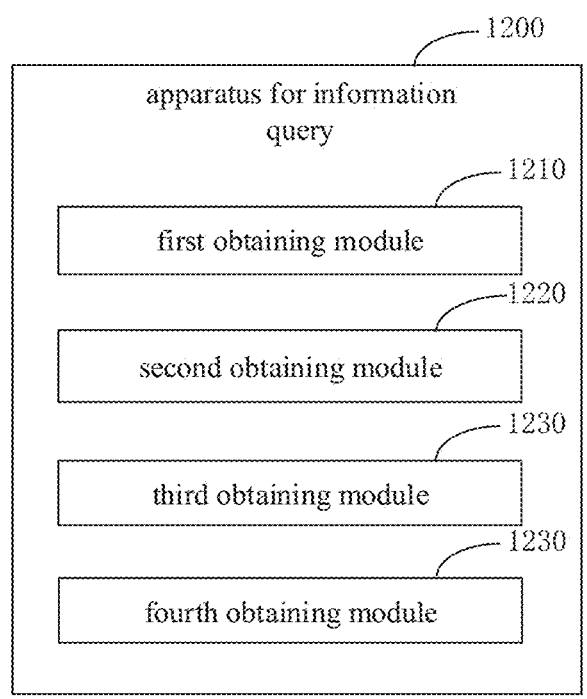
FIG. 12 is a block diagram illustrating an apparatus for information query configured to implement a method for information query in embodiments of the present disclosure.

FIG. 12 is a diagram illustrating a structure of an electronic device according to an embodiment of the present disclosure.

As illustrated in FIG. 12, the apparatus 1200 for information query may include a first obtaining module 1210, a second obtaining module 1220, a third obtaining module 1230 and a fourth obtaining module 1240.

The first obtaining module 1210 is configured to receive a query sentence, segment the query sentence to obtain word segments, and obtain a dependency relationship between two word segments and part of speech of the word segments.

The second obtaining module 1220 is configured to obtain a coding sequence of the query sentence according to the dependency relationship and the part of speech of the word segments.

The third obtaining module 1230 is configured to match the coding sequence with a generalized template to obtain a core corpus of the query sentence; in which, the generalized template comprises part of speech to be extracted and a dependency relationship to be extracted.

The fourth obtaining module 1240 is configured to obtain a query result corresponding to the query sentence based on the core corpus.

Figure 13:
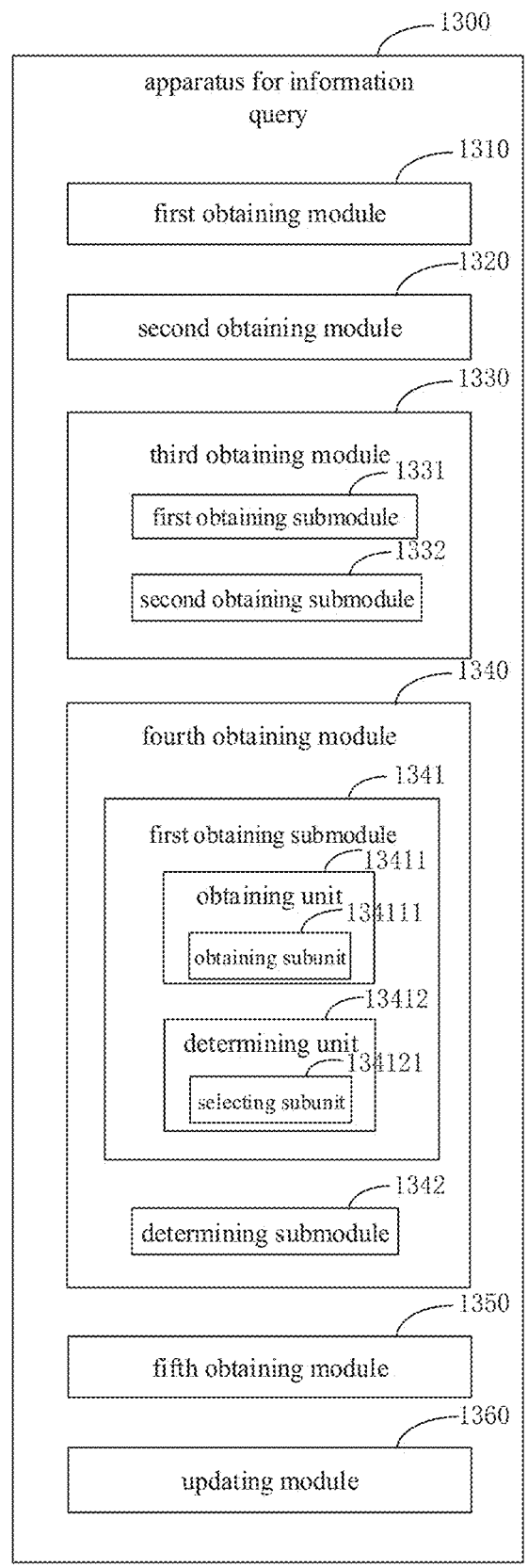
FIG. 13 is a block diagram illustrating an apparatus for information query configured to implement a method for information query in embodiments of the present disclosure.

FIG. 13 is a diagram illustrating a structure of an apparatus for information query according to an embodiment of the present disclosure.

As illustrated in FIG. 13, the apparatus 1300 for information query may include a first obtaining module 1310, a second obtaining module 1320, a third obtaining module 1330 and a fourth obtaining module 1340.

The third obtaining module 1330 includes: a first extraction submodule 1331, configured to extract coding fragments consistent with the part of speech to be extracted from the coding information according to the part of speech to be extracted; a second extraction submodule 1332, configured to determine a generalized boundary among the coding fragments according to the dependence relationship to be extracted, and extract the core corpus according to the generalized boundary.

A fourth obtaining module 1340 includes: a first obtaining submodule 1341, configured to retrieve, based on the core corpus, in a preset corpus database to obtain a target seed corpus corresponding to the core corpus; a determining submodule 1342, configured to determine label data corresponding to the target seed corpus as the query result corresponding to the query sentence.

The first obtaining submodule 1341 includes: an obtaining unit 13411, configured to retrieve, based on the core corpuses, in the preset corpus database to obtain at least one candidate seed corpus corresponding to the core corpus; in which, the preset corpus database stores a plurality of seed corpuses, and the core corpus is a generalized corpus of at least one seed corpus; a determining unit 13412, configured to determine the target seed corpuses from the at least one candidate seed corpus.

The obtaining unit 13411 includes: an obtaining subunit 134111, configured to, retrieve the core corpus from the corpus database based on an inverted index and semantic similarity computation, to obtain at least one candidate seed corpus.

The determining unit 13412 includes: a selecting subunit 134121, configured to obtain a similarity between the core corpus and each candidate seed corpus, and select a candidate seed corpus with the highest similarity as the target seed corpus.

The apparatus 1300 for information query further includes: a fifth obtaining module 1350, configured to obtain the number of the at least one candidate seed corpus; an updating module 1360, configured to update the generalized template in response to the number of the at least one candidate seed corpus greater than a first preset number or less than a second preset number.

It should be noted that, a second obtaining module 1320 has the same function and structure with a second obtaining module 1220.

According to the apparatus for information query in the embodiment of the present disclosure, a dependency relationship and part of speech of the word segments may be obtained through receiving and segmenting a query sentence, and a coding sequence of the query sentence is obtained according to the dependency relationship and the part of speech of the word segments, the coding sequence is matched with a generalized template to obtain core corpuses of the query sentence, and a query result corresponding to the query sentence is obtained further based on the core corpuses of the query sentence, so as to achieve information query without relying on the accumulation of massive business scenario data to enhance generalization ability, thereby ensuring accuracy and efficiency of information query, and improving the efficiency and reliability of the information query process. At the same time, information query in different business scenarios may be supported, with strong expansion capability and high universality.

An electronic device and a readable storage medium are further provided according to embodiments of the present disclosure.

Figure 14:
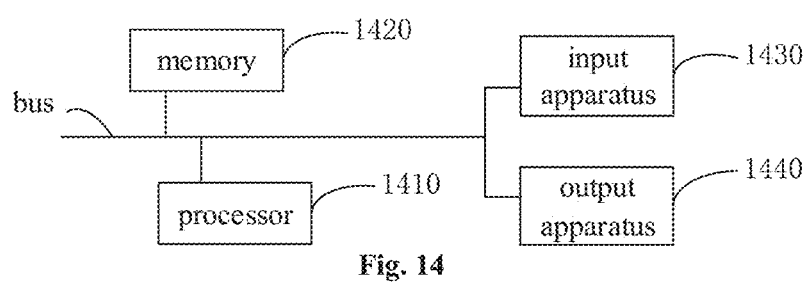
FIG. 14 is a block diagram illustrating an electronic device configured to implement a method for information query in embodiments of the present disclosure.

FIG. 14 is a block diagram illustrating an electronic device for information query in the embodiment of the present disclosure. An electronic device is intended to represent various types of digital computers, such as laptop computers, desktop computers, workstations, personal digital assistants, servers, blade servers, mainframe computers, and other suitable computers. An electronic device may also represent various types of mobile apparatuses, such as personal digital assistants, cellular phones, smart phones, wearable devices, and other similar computing devices. The components shown herein, their connections and relations, and their functions are merely examples, and are not intended to limit the implementation of the disclosure described and/or required herein.

As illustrated in FIG. 14, the electronic device includes: one or more processors 1410, a memory 1420, and an interface configured to connect various components, including a high-speed interface and a low-speed interface. The various components are connected to each other with different buses, and may be installed on a public main board or installed in other ways as needed. The processor may process instructions executed in the electronic device, including instructions stored in or on the memory to display graphical information of the GUI on an external input/output device (such as a display device coupled to an interface). In other implementation, multiple processors and/or multiple buses may be configured with a plurality of memories if necessary. Similarly, the processor may connect a plurality of electronic devices, and each device provides a part of necessary operations (for example, as a server array, a group of blade servers, or a multi-processor system). FIG. 14 takes one processor 1410 as an example.

A memory 1420 is a non-transitory computer-readable storage medium provided in the present disclosure. The memory stores instructions executable by the at least one processor, so that the at least one processor executes a method for information query as described in the present disclosure. The non-transitory computer-readable storage medium of the present disclosure stores computer instructions, in which the computer instructions are configured so that a method for information query provided in the present disclosure.

As a non-transitory computer-readable storage medium, the memory 1420 may be configured to store non-transitory software programs, non-transitory computer-executable programs and modules, such as program instructions/modules corresponding to a method for information query in the embodiment of the present disclosure (for example, a first obtaining module 1210, a second obtaining module 1220, a third obtaining module 1230, and a fourth obtaining module 1240 as illustrated in FIG. 12). The processor 1310 executes various functional applications and data processing of the server by running a non-transitory software program, an instruction, and a module stored in the memory 1420, that is, a method for information query in the above method embodiment is implemented.

The memory 1420 may include a program storage area and a data storage area; the program storage area may store operation systems and application programs required by at least one function; the data storage area may store data created based on the use of a positioning electronic device, etc. In addition, the memory 1420 may include a high-speed random access memory, and may also include a non-transitory memory, such as at least one magnetic disk storage device, a flash memory device, or other non-transitory solid-state storage devices. In some embodiments, the memory 1420 optionally includes a memory set remotely relative to the processor 1410 that may be connected to a positioning electronic device via a network. The example of the above networks includes but not limited to an Internet, an enterprise intranet, a local area network, a mobile communication network and their combination.

An electronic device for information query may further include an input apparatus 1430 and an output apparatus 1440. The processor 1410, the memory 1420, the input apparatus 1430, and the output apparatus 1440 may be connected through a bus or in other ways. FIG. 14 takes connection through a bus as an example.

The input apparatus 1430 may receive input digital or character information, and generate key signal input related to user setting and function control of a positioning electronic device, such as a touch screen, a keypad, a mouse, a track pad, a touch pad, an indicating rod, one or more mouse buttons, a trackball, a joystick and other input apparatuses.

The output apparatus 1440 may include a display device, an auxiliary lighting apparatus (for example, a LED) and a tactile feedback apparatus (for example, a vibration motor), etc. The display device may include but not limited to a liquid crystal display (LCD), a light emitting diode (LED) display and a plasma display. In some implementations, a display device may be a touch screen.

Various implementation modes of the systems and technologies described herein may be implemented in a digital electronic circuit system, an integrated circuit system, a dedicated ASIC (application specific integrated circuit), a computer hardware, a firmware, a software, and/or combinations thereof. The various implementation modes may include: being implemented in one or more computer programs, and the one or more computer programs may be executed and/or interpreted on a programmable system including at least one programmable processor, and the programmable processor may be a dedicated or a general-purpose programmable processor that may receive data and instructions from a storage system, at least one input apparatus, and at least one output apparatus, and transmit the data and instructions to the storage system, the at least one input apparatus, and the at least one output apparatus.

The computer programs (also called as programs, software, software applications, or codes) include machine instructions of a programmable processor, and may be implemented with high-level procedure and/or object-oriented programming languages, and/or assembly/machine languages. As used herein, the terms "a machine-readable medium" and "a computer-readable medium" refer to any computer program product, device, and/or apparatus configured to provide machine instructions and/or data for a programmable processor (for example, a magnetic disk, an optical disk, a memory, a programmable logic device (PLD)), including a machine-readable medium that receive machine instructions as machine-readable signals. The term "a machine-readable signal" refers to any signal configured to provide machine instructions and/or data for a programmable processor.

In order to provide interaction with the user, the systems and technologies described here may be implemented on a computer, and the computer has: a display apparatus for displaying information to the user (for example, a CRT (cathode ray tube) or a LCD (liquid crystal display) monitor); and a keyboard and a pointing apparatus (for example, a mouse or a trackball) through which the user may provide input to the computer. Other types of apparatuses may further be configured to provide interaction with the user; for example, the feedback provided to the user may be any form of sensory feedback (for example, visual feedback, auditory feedback, or tactile feedback); and input from the user may be received in any form (including an acoustic input, a voice input, or a tactile input).

The systems and technologies described herein may be implemented in a computing system including back-end components (for example, as a data server), or a computing system including middleware components (for example, an application server), or a computing system including front-end components (for example, a user computer with a graphical user interface or a web browser through which the user may interact with the implementation mode of the system and technology described herein), or a computing system including any combination of such back-end components, middleware components or front-end components. The system components may be connected to each other through any form or medium of digital data communication (for example, a communication network). Examples of communication networks include: a local area network (LAN), a wide area network (WAN), an internet and a blockchain network.

The computer system may include a client and a server. The client and server are generally far away from each other and generally interact with each other through a communication network. The relation between the client and the server is generated by computer programs that run on the corresponding computer and have a client-server relationship with each other. A server may be a cloud server, also known as a cloud computing server or a cloud host, is a host product in a cloud computing service system, to solve the shortcomings of large management difficulty and weak business expansibility existed in the traditional physical host and Virtual Private Server (VPS) service. A server further may be a server with a distributed system, or a server in combination with a blockchain.

A computer program product is further provided in the present disclosure, which is configured to implemented the method for information query when executed by an instruction processor.

According to the method for information query in the embodiment of the present disclosure, a dependency relationship and part of speech of the word segments may be obtained through receiving and segmenting a query sentence, and a coding sequence of the query sentence is obtained according to the dependency relationship and the part of speech of the word segments, and the coding sequence is matched with a generalized template to obtain core corpuses of the query sentence, and further based on the core corpuses of the query sentence, a query result corresponding to the query sentence is obtained to achieve information query, no longer relying on the accumulation of massive business scenario data to enhance generalization ability, ensure accurate and efficient information query, and improve the efficiency and reliability of the information query process. At the same time, information query in different business scenarios may be supported, with strong expansion capability and high universality.

It should be understood that, various forms of procedures shown above may be configured to reorder, add or delete blocks. For example, blocks described in the present disclosure may be executed in parallel, sequentially, or in a different order, as long as the desired result of the technical solution disclosed in the present disclosure may be achieved, which will not be limited herein.

The above specific implementations do not constitute a limitation on the protection scope of the present disclosure. Those skilled in the art should understand that various modifications, combinations, sub-combinations and substitutions may be made according to design requirements and other factors. Any modification, equivalent replacement, improvement, etc., made within the spirit and principle of embodiments of the present disclosure shall be included within the protection scope of embodiments of the present disclosure.

What is claimed is:

1. A method for information query, comprising:
    receiving a query sentence, segmenting the query sentence to obtain word segments, and obtaining a dependency relationship between two word segments and part of speech of the word segments;
    obtaining a coding sequence of the query sentence according to the dependency relationship and the part of speech of the word segments;
    matching the coding sequence with a generalized template to obtain a core corpus of the query sentence, wherein the generalized template comprises part of speech to be extracted and a dependency relationship to be extracted; and
    obtaining a query result corresponding to the query sentence based on the core corpus,
    wherein, obtaining the query result corresponding to the query sentence based on the core corpus comprises:
    retrieving, based on the core corpus, in a preset corpus database to obtain a target seed corpus corresponding to the core corpus;
    determining label data corresponding to the target seed corpus as the query result corresponding to the query sentence,
    wherein, retrieving, based on the core corpuses, in the preset corpus database to obtain the target seed corpus corresponding to the core corpus comprises:
    retrieving, based on the core corpus, in the preset corpus database to obtain at least one candidate seed corpus corresponding to the core corpus; wherein, the preset corpus database stores a plurality of seed corpuses, and the core corpus is a generalized corpus of at least one seed corpus; and
    determining the target seed corpus from the at least one candidate seed corpus.

2. The method of claim 1, wherein, matching the coding sequence with the generalized template to obtain the core corpus of the query sentence comprises:
    extracting coding fragments consistent with the part of speech to be extracted from the coding sequence according to the part of speech to be extracted;
    determining a generalized boundary among the coding fragments according to the dependence relationship to be extracted, and extracting the core corpus according to the generalized boundary.

3. The method of claim 1, wherein, retrieving, based on the core corpus, in the corpus database to obtain the at least one candidate seed corpus corresponding to the core corpus comprises:
    retrieving the core corpus from the corpus database based on an inverted index and semantic similarity computation, to obtain at least one candidate seed corpus.

4. The method of claim 1, wherein, determining the target seed corpus from the at least one candidate seed corpus comprises:
    obtaining a similarity between the core corpus and each candidate seed corpus, and selecting a candidate seed corpus with the highest similarity as the target seed corpus.

5. The method of claim 1, further comprising:
    obtaining the number of the at least one candidate seed corpus; and
    updating the generalized template in response to the number of the at least one candidate seed corpus greater than a first preset number or less than a second preset number.

6. An apparatus for information query, comprising:
    one or more processors;
    a memory storing instructions executable by the one or more processors;
    wherein the one or more processors are configured to:
    receive a query sentence, segment the query sentence to obtain word segments, and obtain a dependency relationship between two word segments and part of speech of the word segments;
    obtain a coding sequence of the query sentence according to the dependency relationship and the part of speech of the word segments;

match the coding sequence with a generalized template to obtain a core corpus of the query sentence; wherein, the generalized template comprises part of speech to be extracted and a dependency relationship to be extracted;

obtain a query result corresponding to the query sentence based on the core corpus, wherein the one or more processors are configured to:

retrieve, based on the core corpus, in a preset corpus database to obtain a target seed corpus corresponding to the core corpus;

determine label data corresponding to the target seed corpus as the query result corresponding to the query sentence, wherein the one or more processors are configured to:

retrieve, based on the core corpuses, in the preset corpus database to obtain at least one candidate seed corpus corresponding to the core corpus; wherein, the preset corpus database stores a plurality of seed corpuses, and the core corpus is a generalized corpus of at least one seed corpus; and determine the target seed corpus from the at least one candidate seed corpus.

7. The apparatus of claim 6, wherein the one or more processors are configured to:

extract coding fragments consistent with the part of speech to be extracted from the coding information according to the part of speech to be extracted;

determine a generalized boundary among the coding fragments according to the dependence relationship to be extracted, and extract the core corpus according to the generalized boundary.

8. The apparatus of claim 6, wherein the one or more processors are configured to:

retrieve the core corpus from the corpus database based on an inverted index and semantic similarity computation, to obtain at least one candidate seed corpus.

9. The apparatus of claim 6, wherein the one or more processors are configured to:

obtain a similarity between the core corpus and each candidate seed corpus, and select a candidate seed corpus with the highest similarity as the target seed corpus.

10. The apparatus of claim 6, wherein the one or more processors are configured to:

obtain the number of the at least one candidate seed corpus; and update the generalized template in response to the number of the at least one candidate seed corpus greater than a first preset number or less than a second preset number.

11. A non-transitory computer-readable storage medium storing computer instructions, wherein when the computer instructions are executed by a computer, the computer is caused to perform a method for information query, and the method comprises:

receiving a query sentence, segmenting the query sentence to obtain word segments, and obtaining a dependency relationship between two word segments and part of speech of the word segments;

obtaining a coding sequence of the query sentence according to the dependency relationship and the part of speech of the word segments;

matching the coding sequence with a generalized template to obtain a core corpus of the query sentence, wherein the generalized template comprises part of speech to be extracted and a dependency relationship to be extracted; and obtaining a query result corresponding to the query sentence based on the core corpus, wherein, obtaining the query result corresponding to the query sentence based on the core corpus comprises:

retrieving, based on the core corpus, in a preset corpus database to obtain a target seed corpus corresponding to the core corpus;

determining label data corresponding to the target seed corpus as the query result corresponding to the query sentence, wherein, retrieving, based on the core corpuses, in the preset corpus database to obtain the target seed corpus corresponding to the core corpus comprises:

retrieving, based on the core corpus, in the preset corpus database to obtain at least one candidate seed corpus corresponding to the core corpus; wherein, the preset corpus database stores a plurality of seed corpuses, and the core corpus is a generalized corpus of at least one seed corpus; and determining the target seed corpus from the at least one candidate seed corpus.

* * * * *